July 14, 1959 V. H. WATERMAN 2,894,593
REAR DRIVE ASSEMBLY
Filed Feb. 10, 1958 3 Sheets-Sheet 1
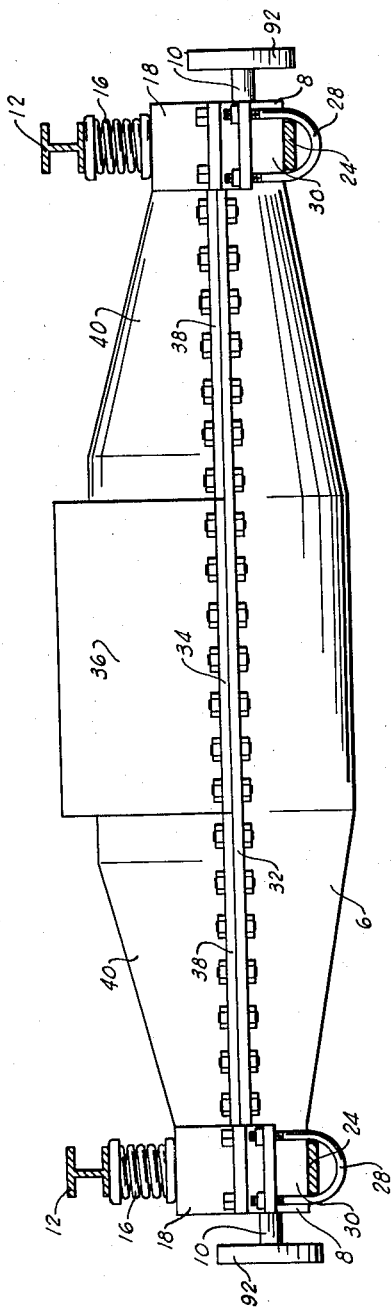
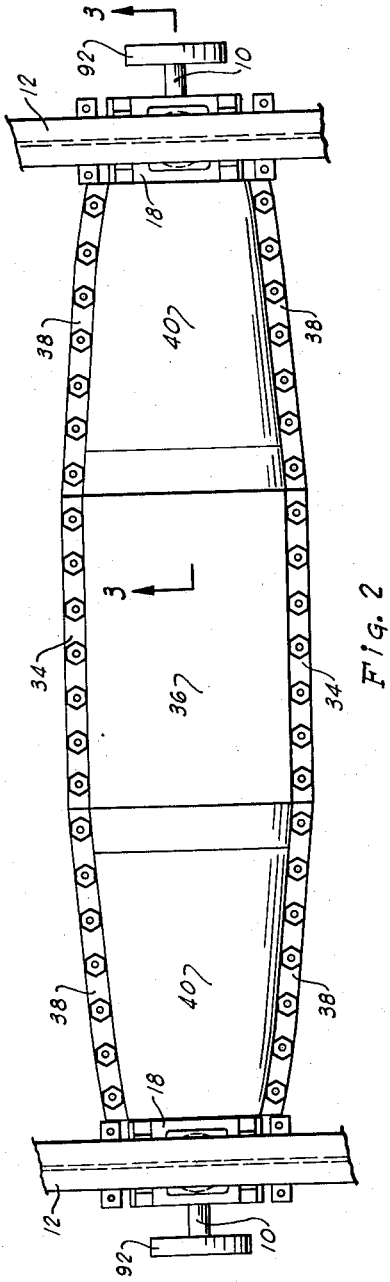
INVENTOR.
VIRGIL H. WATERMAN
BY
ATTORNEY July 14, 1959

V. H. WATERMAN 2,894,593

REAR DRIVE ASSEMBLY

Filed Feb. 10, 1958

INVENTOR.
VIRGIL H. WATERMAN
BY
*Jerry J. Dunlap*
ATTORNEY

July 14, 1959  V. H. WATERMAN  2,894,593
REAR DRIVE ASSEMBLY
Filed Feb. 10, 1958  3 Sheets-Sheet 3

INVENTOR.
VIRGIL H. WATERMAN
BY
ATTORNEY

United States Patent Office 2,894,593
Patented July 14, 1959

2,894,593

REAR DRIVE ASSEMBLY

Virgil H. Waterman, Ponca City, Okla.

Application February 10, 1958, Serial No. 714,100

3 Claims. (Cl. 180—56)

This invention relates generally to improvements in motor vehicles, and more particularly, to an improved rear drive assembly for motor vehicles.

As it is well known in the art, the majority of present day motor vehicles have the engine located in the forward portion of the vehicle and connected by a long drive shaft to the rear axle of the vehicle to rotate and drive the rear wheels. Such a drive system requires an unduly large power unit for the required output at the rear wheels, due principally to the loss of horsepower in the mechanical connection of the power unit to the rear axle. Also, the various portions of the drive system, particularly the transmission, clutch and differential, are virtually inaccessible to mechanics, and large amounts of time are lost in merely gaining access to a defective part.

Several rear drive assemblies, wherein the engine is placed in the rear portion of the vehicle, have been devised, but none have been widely accepted in the automobile industry. These previous rear drive assemblies may be placed in two categories. In one category, the power is taken from one end of the engine and the engine is located in off-set relation to the rear axle of the automobile, whereby a gear-train must be provided to connect the rear axle to the drive shaft of the engine. Such a system provides a compact structure, but a large amount of power is lost in transmitting motion of the engine drive shaft to the rear axle, and such systems have been housed in such a manner that repair of the systems are difficult. In the second category of previous rear drive assemblies, the engine is placed in line with the rear wheels and connected to the rear axle from both ends of the engine. This last mentioned system further reduces the horsepower lost between the engine and the rear wheels, but heretofore such systems have used two hydramatic transmissions, such that the power output of the engine must still be substantially greater than the power which can be applied to the rear wheels. Also, such systems have been arranged and housed in such a manner that access to the various portions of the system and repair thereof is unduly difficult.

The present invention contemplates a rear drive assembly wherein the engine is placed in line with the wheels to be driven, and power is taken from both ends of the engine drive shaft. The engine output is transmitted only through a fluid drive assembly and a mechanical transmission at each end of the engine, such that the power output of the engine may be utilized to the maximum degree, and a minimum horsepower loss occurs between the engine and the wheels. The present system provides both forward and reverse speeds for the wheels, without the use of clutches, such that control of the power system is minimized and the operating parts are maintained at a minimum. The present invention also contemplates a housing combination for the drive assembly such that access to any portion of the drive assembly may be easily gained, and repair of the system will be materially facilitated. The housing combination also provides a sump for the engine and a housing for the transmission to further reduce material requirements.

An important object of this invention is to facilitate repair of motor vehicle drive systems.

A further object of this invention is to provide a rear drive assembly wherein the minimum horsepower will be lost between the driving engine and the wheels being driven.

A further object of this invention is to provide a rear drive assembly for motor vehicles having forward and rear speeds, with the use of a minimum number of elements in the system.

Another object of this invention is to minimize the control necessary to operate a motor vehicle drive system and provide a power ratio between the engine and wheels which will minimize power losses through inefficient drivers, particularly under rural driving conditions.

A still further object of this invention is to provide a rear drive assembly for motor vehicles which is simple in construction and may be economically manufactured.

Other objects and advantages of the invention will be evident from the following detailed description, when read in conjunction with the accompanying drawings which illustrate my invention.

In the drawings:

Figure 1 is a schematic elevational view of a drive assembly constructed in accordance with this invention.

Figure 2 is a plan view of the system shown in Fig. 1.

Figure 3:
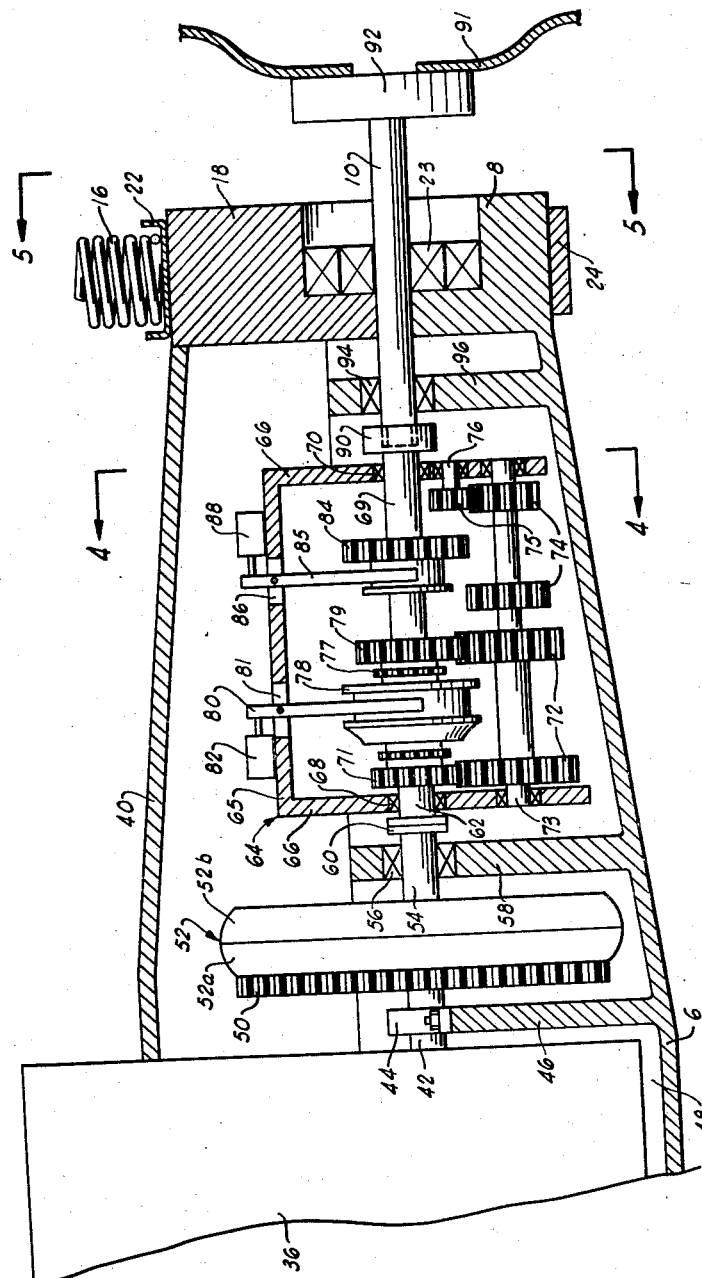
Figure 3 is a partial, schematic sectional view of the drive system, as taken along lines 3—3 of Fig. 2.
Figure 5:
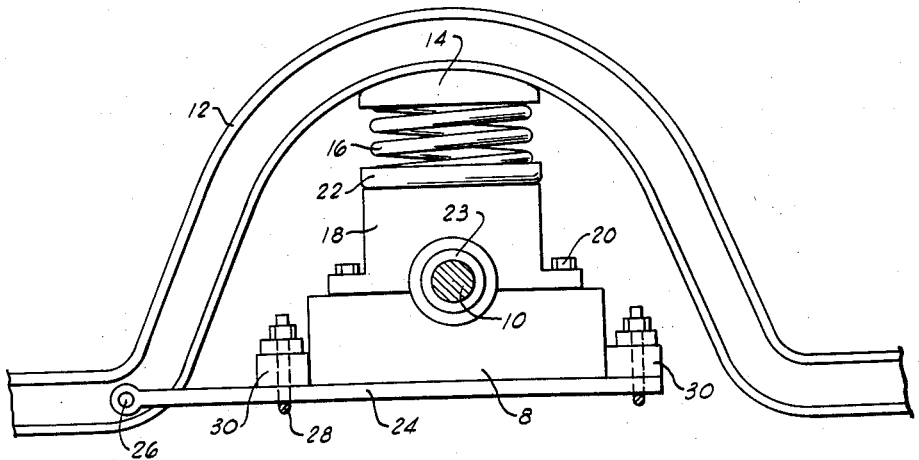
Figure 5 is a sectional view as taken along lines 5—5 of Fig. 3.

Referring to the drawings in detail, and particularly Figs. 1 and 2, reference character 6 designates an open-topped housing having a length substantially corresponding to the width of the motor vehicle (not shown) on which the present system is to be used. A block 8 (see also Figs. 3 and 5) is formed on each end of the elongated housing 6 to receive the axles 10 and support the motor vehicle side frames 12 on the axles 10. Each side member 12 of the motor vehicle frame is curved upwardly over the respective end of the housing 6 in the normal fashion, and is provided with a suitable spring anchoring member 14 on the lower face thereof directly above the respective axle 10. Each anchor 14 receives the upper end of a helical compression spring 16 extending upwardly from the respective block 8. The lower end of each spring 16 is supported by a hub portion 18 secured to the upper face of the block 8 by bolts 20 in a position astraddle (Fig. 5) of the respective axle 10, and another spring anchoring member 22 on the upper end of the respective hub 18. A two race annular bearing 23, of the type wherein the inner race is pressed onto the respective axle 10 and may be removed from the outer race, is secured in mating recesses in each block 8 and hub 18. It will thus be observed that the weight of the rear portion of the motor vehicle will be imposed through the springs 16 and hubs 18 onto the axles 10.

In order to maintain the housing 6 in proper alignment with the motor vehicle, I provide a stabilizing bar 24 at each end of the housing 6. Each stabilizing bar 24 is secured by a pin 26 to a portion of the respective motor vehicle frame member 12 forward of the housing 6, such that the bars 24 may pivot vertically, but not horizontally. Each bar 24 is secured to the respective block 8 by a pair of U-bolts 28. Each U-bolt 28 extends around an extension 30 formed on each end of the respective block 8 to facilitate connection of the block 8 to the stabilizing bar 24. The extensions 30 are preferably cast integrally with the respective blocks 8 to provide a rigid and strong structure.

Referring back to Figs. 1 and 2, it will be observed that bolting flanges 32 are formed on the upper edges of the elongated housing 6 between the block members 8. The flanges 32 are provided to receive the mating flanges 34 on the opposite sides of an internal combustion engine 36, and the mating flanges 38 of two cover members 40. The covers 40 are of a length to extend from the respective end of the engine 36 to the respective block 8 and effectively seal off the top of the housing 6. The engine 36 may be of any suitable type which has its crank or drive shaft 42 (see Fig. 3) extending from each end of the engine. It may also be noted that almost all present day internal combustion engines have mounting flanges 34 formed on the opposite sides thereof which may be used to mate with the central portions of the flanges 32 at the upper end of the lower housing 6. The controls (throttle, choke, etc., not shown) will, of course, be extended into the vehicle accessible to the driver.

Each end portion of the drive shaft 42 (Fig. 3) extends through a pillow block type bearing 44 mounted on the upper end of a partition 46 formed across the housing 6 adjacent the respective end of the engine 36. The partitions 46 not only provide supports for the drive shaft 42, but also divide off the central portion 48 of the housing 6 to form an oil sump around the lower end of the engine 36. Thus, a separate oil sump need not be provided in the present system, as in present day drive assemblies.

Each end of the drive shaft 42, outwardly of the respective bearing 44, is suitably secured to a fly wheel 50 mounted on the driving end of a suitable fluid drive 52. The fly wheels 50 perform the usual function of assisting in maintaining a uniform speed for the engine 36, and one or both of the fly wheels 50 may be geared to the usual auxiliary equipment, such as an oil pump, water pump, and generator (not shown). Each fluid drive 52 may be of any suitable construction which will provide a smooth transfer of torque from the driving portion 52a to the driven portion 52b and provide a slippage between the members 52a and 52b when the speed of the engine 36 is suddenly changed, or the rotation of the portion 52b is suddenly decreased, as it is well known in the art.

A stub shaft 54 is secured to the driven portion 52b of each fluid drive 52 and is supported by a combination bearing and oil seal 56 in another partition 58 extending upwardly from the lower end of the housing 6. The partitions 58 preferably extend above the shafts 54, for purposes as will be hereinafter set forth. The outer end of the stub shaft 54 is secured by a suitable coupling 60 to the input shaft 62 of a mechanical transmission unit generally designated by reference character 64.

Figure 4:
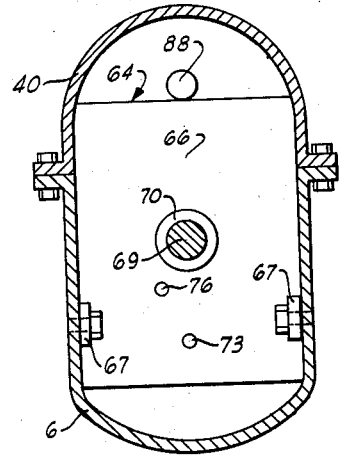
Figure 4 is a sectional view as taken along lines 4—4 of Fig. 3.

Each transmission unit 64 comprises an inverted U-shaped housing 65 having depending sides 66 of a length to extend across the housing 6. Suitable brackets 67 (Fig. 4) are provided on the opposite ends of the sides 66 of the housings to facilitate bolting the housings 65 rigidly in the housing 6. The input shaft 62 of each transmission is journaled by a bearing 68 in the inner side 66 of the respective housing 65, and the output shaft 69 of each transmission is journaled by a bearing 70 in the outer side 66 of the respective housing 65 in alignment with the respective input shaft 62.

The gearing arrangement of each transmission 64 is of a standard design, and includes a main drive gear 71 secured on the inner end portion of the input shaft 62 driving a cluster gear 72 supported on a shaft 73 below the main gear 71. The shaft 73 is suitably journaled at its opposite ends in the transmission housing sides 66 and also supports the idler gear 74 in alignment with the cluster gear 72. The idler gear 74 in turn drives another idler gear 75 supported on a stub shaft 76 adjacent the outer side wall 66 of the transmission housing.

The output shaft 69 of each transmission 64 is connected to the input shaft 62 by a suitable synchronizing clutch 77 having a grooved operator 78 therearound. The clutch 77 operates to provide a direct drive between the input shaft 62 and output shaft 69; to disconnect the input and output shafts; or connect the second gear 79 to the cluster gear 72. A bifurcated shift lever 80 is pivotally secured in a slot 81 in the top of the housing 65 and extends down around the grooved operator 78 to control the action of the clutch 77. The upper end of the lever 80 is connected to a double acting solenoid 82 which may be conveniently secured on the top of the respective housing 65.

A low and reversing gear 84 is splined onto the output shaft 69 outwardly of the second gear 79 to engage the gears 74 or 75, in the usual manner. The shift lever 85 for the low and reversing gear 84 is also pivotally secured in a slot 86 in the top of the housing 65 to move the gear 84 between its engaged and neutral positions. Another double acting solenoid 88 is secured to the top of the housing 65 and connected to the upper end of the shift lever 85.

The outer end of the output shaft 69 of each transmission 64 is provided with an internally splined housing 90 to receive the inner splined end of the respective axle 10. Set screws (not shown) are also used to secure the axles 10 in the housings 90. Thus, the motion of the transmission output shafts 69 will be transmitted to the axles 10 to drive the axles and wheels (partially shown at 91) of the motor vehicle. The wheels 91 are secured to wheel flanges 92 on the outer ends of the axles. The inner end portion of each axle 10 is journaled in a combination bearing and oil seal 94 provided in another partition 96 extending across the housing 6. The partition 96 preferably extends to about the top of the housing 6, the same as the partition 58, in order that lubricant may be retained in the housing 6 between these two partitions at a level to effectively lubricate the various gears of the respective transmission 64.

Figure 6:
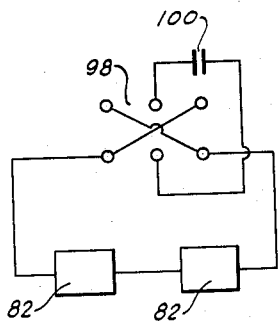
Figure 6 is a schematic wiring diagram of the control system for a portion of the transmissions.

As will be apparent, the two transmissions 64 must be shifted simultaneously and operated uniformly to provide a practical drive system. To accomplish such uniformity, I prefer to electrically interconnect corresponding solenoids of the two transmissions in series, as illustrated by the connection of the two solenoids 82 in Fig. 6. Each of these series circuits are connected by a suitable switch 98 to a power source 100, such that the current can be directed through the respective solenoids in either direction. For purposes of illustration, I have shown the switch 98 as being cross-wired, with the power source 100 connected to the center poles of the switch to provide the desired control. The switches 100 are, of course, located in the motor vehicle in positions conveniently accessible to the operator of the vehicle.

*Operation*

The motor vehicle brakes are preferably applied and the transmissions 64 placed in neutral before the engine 36 is started. In this condition, the engine 36 merely drives the fluid drives 52, and gears 71, 72, 74 and 75 of the transmissions 64 while being warmed-up. With the engine 36 slowed to idling speed, one of the switches 100 is operated to engage either the synchronizing clutches 77 or the gears 84 and transmit a reverse or one of the three forward torques to the transmission output shafts 69. Upon release of the vehicle brakes, power is supplied from both ends of the engine drive shaft 42 through the fluid drives 52 and transmissions 64 to turn the vehicle wheels in the desired direction.

As previously indicated, the transmissions 64 are shifted to provide either a direct drive from the input shafts 62 to the output shafts 69; engagement of the second gears 79 for a greater transfer of power to the axles 10; engagement of the low gears 84 and 74 for a still greater transfer of power to the wheels; or engagement of the gears 84 and 75 for the reverse drive. It is to be especially noted that no clutch is provided for either of the transmissions 64. Therefore, when it is desired to change the forward gears, as well as when it is desired to change to or from the reverse drive, the vehicle is stopped and the engine 36 slowed to idling before the switches 100 are operated. This would appear disadvantageous, since such operation is different from present day drive systems. However, when various driving conditions are analyzed, it will be found that the operation of the system is most effective for present day driving conditions and will provide substantial fuel savings.

The engagement of the low gears 84 and 74 is used only when an exceptionally large power is required for the vehicle wheels, as when climbing an extremely steep hill or when pushing a vehicle in distress. Such driving conditions are seldom encountered, and stopping the vehicle to change gears for these conditions may be easily and conveniently done.

The engagement of the second gears 79 is used when a moderate torque improvement is desired between the engine and wheels, as when the vehicle is driven in traffic or, generally, in urban areas where the vehicle is frequently stopped and started. The fluid drives 52 provide a smooth transfer of power from the engine 36, particularly when the vehicle is being started from a stop sign or light, to provide an acceptable acceleration. It should also be noted that the gears 79 correspond to what is commonly known as "second gear," and, in present day vehicles, speeds of sixty m.p.h. may be easily reached in this gear. Thus a vehicle may be accelerated at a relatively fast rate and operated at speeds more than sufficient when using the present system with the gears 79 and 72 engaged.

The direct drive connection between the input shafts 62 and output shafts 69 is used for rural driving conditions. Such connection provides the highest efficiency in power transfer from the engine 36 to the vehicle wheels. At uniform speeds of the engine 36, the driving and driven portions 52a and 52b of the fluid drives 52 will be turned simultaneously. However, when the engine 36 is accelerated, the fluid drives 52 provide a slippage and a gradual increase in speed of the transmission input shafts 62. Thus a vehicle may be started from a stopped position when the input and output shafts 62 and 69 are directly connected, without overloading and stalling the engine as would occur in a drive system having only a mechanical transmission.

It should also be noted that the fluid drives 52 will provide a slippage in the drive system at one end of the engine 36 when the vehicle is going around a corner or curve, as well as when one of the rear wheels becomes stuck, to provide the desired movement of the vehicle.

One of the most important features of the present invention is the ease with which the drive assembly may be repaired. The assembly will, of course, be located to the rear of the vehicle passenger seats, and the top of the assembly may be easily exposed. When any portion of the drive assembly is not operating properly, it is simply necessary to unbolt and remove the two covers 40 to gain access to all parts of the assembly. A mechanic can reach both of the fluid drive assemblies 52 and the transmissions 64 to perform minor repairs. If any substantial repairs of either of these units is required, they can be easily uncoupled from either the drive shaft 42 or the axle 10 and moved from the housing 6 to a work bench or the like for more convenient repair. Each axle 10 may easily be removed by disconnecting the set screws holding the inner end of the axle in the splined housing 90 and pulling outwardly on the axle. The axle will slide out through the bearing 94 and the outer race of the bearing 23. The respective transmission 64 may then be removed by disconnecting the coupling 60 from the stub shaft 54 and the brackets 67 from the sides of the housing 6.

From the foregoing it will be apparent that the present invention provides a novel rear drive assembly which will have a minimum loss of horsepower between the engine and the rear wheels of a motor vehicle. The present assembly will occupy a minimum space, since the driving engine is located in the alignment with the rear wheels of the vehicle and all portions of the drive assembly are positioned between the engine and the rear wheels. It will also be apparent that the present invention provides a drive assembly which may be easily repaired in place in a motor vehicle, and any portion of the drive assembly may be easily removed for extensive repair or replacement of parts. Further, the present drive assembly is simple in construction, may be economically manufactured, and will have a long service life.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. A rear drive assembly for a vehicle having side frame members, comprising an elongated housing U-shaped in cross-section extending transversely across the vehicle, blocks formed on the opposite ends of said housing below the vehicle side frame members, a hub secured on top of each block, bearings secured in mating apertures in said hubs and blocks, the bearings at the opposite sides of the vehicle being aligned, springs anchored between each of said hubs and the respective vehicle side frame to impose the weight of the rear portion of the vehicle on said blocks and hubs, an engine having a drive shaft extending from the opposite ends thereof secured in the central portion of said housing with its drive shaft extending transversely with respect to the vehicle, said engine having its lower end portion extending into said housing and its upper portion positioned above said housing, a fluid drive assembly coupled to each end of the engine drive shaft, a transmission drivingly connected to each fluid drive assembly, an axle drivingly connected to each transmission, the axle at each end of said housing being extended through the respective bearing in the respective hub and block, and covers secured to said housing between the ends of said engine and said blocks over said fluid drive assemblies and transmissions.

2. An assembly as defined in claim 1 characterized further in that partitions are extended across said housing adjacent the opposite ends of the engine to form an oil sump in the central portion of the housing for the engine.

3. An assembly as defined in claim 1 characterized further in that said transmission is a mechanical transmission and the gears thereof are exposed to the interior of said housing, and partitions extending across said housing at each end of each transmission to form a lubricant reservoir in said housing for the gears of each transmission.

References Cited in the file of this patent

UNITED STATES PATENTS

| 1,814,424 | Barr | July 14, 1931 |
| 2,039,210 | Bugatti | Apr. 28, 1936 |
| 2,244,875 | Framhein | June 10, 1941 |
| 2,310,513 | Burns | Feb. 9, 1953 |
| 2,647,411 | Filocamo | Aug. 4, 1953 |

FOREIGN PATENTS

| 331,624 | France | Aug. 7, 1903 |